(12) United States Patent
Macpherson et al.

(10) Patent No.: US 6,950,283 B2
(45) Date of Patent: Sep. 27, 2005

(54) STACKED ACTUATOR ARM ASSEMBLY CLAMP

(75) Inventors: Aaron Steve Macpherson, Fort Collins, CO (US); Joe Amade Wood, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 368 days.

(21) Appl. No.: 10/183,746

(22) Filed: Jun. 25, 2002

(65) Prior Publication Data

US 2003/0128477 A1 Jul. 10, 2003

Related U.S. Application Data

(60) Provisional application No. 60/347,308, filed on Jan. 9, 2002.

(51) Int. Cl.⁷ ............................. G11B 5/55; G11B 21/08
(52) U.S. Cl. ................................. 360/265.7; 360/264.2
(58) Field of Search .......................... 360/264.2, 265.7, 360/265.9, 266, 266.1

(56) References Cited

U.S. PATENT DOCUMENTS

| | | | | |
|---|---|---|---|---|
| 4,879,617 A | * | 11/1989 | Sampietro et al. | 360/265 |
| 5,491,598 A | * | 2/1996 | Stricklin et al. | 360/265.6 |
| 5,644,452 A | | 7/1997 | Cox et al. | 360/106 |
| 5,867,348 A | * | 2/1999 | Suwa | 360/265.2 |
| 5,953,183 A | | 9/1999 | Butler et al. | 360/106 |
| 6,166,888 A | | 12/2000 | Tsuda et al. | 360/264.2 |
| 6,252,743 B1 | | 6/2001 | Bozorgi | 360/244.1 |
| 6,396,665 B1 | | 5/2002 | Asano | 360/264.2 |

FOREIGN PATENT DOCUMENTS

| | | | | | |
|---|---|---|---|---|---|
| EP | 576839 A2 | * | 1/1994 | | G11B/21/22 |
| JP | 60236171 A | * | 11/1985 | | G11B/21/02 |
| JP | 03093076 A | * | 4/1991 | | G11B/21/02 |
| JP | 2001035099 A | * | 2/2001 | | G11B/21/02 |

* cited by examiner

Primary Examiner—William J. Klimowicz
(74) Attorney, Agent, or Firm—Derek J. Berger

(57) ABSTRACT

A stacked actuator assembly has symmetrical actuator arms and spacers stacked on a rotatable sleeve. The assembly may have circuit elements or other elements attached on one side of the assembly. The weight of these elements is counter balanced by a screw or pin mounted on the other side of the assembly. The screw passes through the stacked armature arms and spacers to clamp the arms and spacers relative to each other and prevent them from rotating relative to each other. In addition, the spacers may be position registered relative to each other by registration members molded into the spacers. The registration members in adjacent spacers mate with each other to register the spacers relative to each other. The stacked actuator assembly may be assembled on a jig. The jig has a mounting hole or post to receive the sleeve for the stacked actuator assembly, and it has a post to register the arms when they are stacked on the sleeve. It has a spacer registration member to register the first spacer stacked on the sleeve; thereafter, the additional spacers stacked on the assembly register relative to each other. Alternatively, the jig may have a second post to register the position of the spacer that carries the coil of the voice coil motor.

13 Claims, 5 Drawing Sheets

STACKED ACTUATOR ARM ASSEMBLY CLAMP

RELATED APPLICATIONS

This application claims priority of U.S. provisional application Ser. No. 60/347,308 filed Jan. 9, 2002.

FIELD OF THE INVENTION

This application relates generally to disc drives and more particularly to a stacked actuator arm having a flex circuit attached thereto in a disc drive.

BACKGROUND OF THE INVENTION

A typical disc drive includes a base to which various components of the disc drive are mounted. The components include a spindle motor, which rotates one or more discs at a constant high speed. Information is written to and read from tracks on the discs through the use of an actuator assembly, which rotates during a seek operation about a bearing shaft assembly positioned adjacent the discs. The actuator assembly may include a plurality of actuator arms, which extend towards the discs, with one or more head gimbal assemblies extending from each of the actuator arms. Each head gimbal assembly includes a flexure or load beam and a head mounted at the distal end of the load beam. Each head includes an air bearing slider enabling the head to fly in close proximity above the corresponding surface of the associated disc. Head gimbal assemblies are typically attached to the corresponding metallic actuator arms by a metallic spring member spot welded to the metallic load beams and to the metallic actuator arms. The spring member biases the head gimbal assembly towards the surface of the disc.

During a seek operation, the track position of the heads is controlled through the use of a voice coil motor, which typically includes a coil attached to the actuator assembly, as well as one or more permanent magnets, which establish a magnetic field in which the coil is immersed. Application of current to the coil causes the coil to move. As the coil moves, the actuator assembly pivots about the bearing shaft assembly, and the heads are caused to move across the surfaces of the discs.

A circuit assembly provides the requisite electrical connection paths for the actuator assembly while allowing pivotal movement of the actuator assembly during operation. The flex assembly includes a printed circuit board to which head wires (not shown) are connected; the head wires being routed along the actuator arms and the load beams to the heads. The printed circuit board typically includes circuitry for controlling the write currents applied to the heads during a write operation and a preamplifier for amplifying read signals generated by the heads during a read operation.

The head wires, the printed circuit board, the actuator arms, and the coil are all separate parts that must be assembled during manufacturing of the disc drive. The assembly and the cost of manufacturing the separate components add to the overall cost of manufacturing the disc drive.

Additionally, vibrations in the disc drive, particularly in the actuator arms and the head gimbal assemblies, can have an adverse effect on drive reliability by creating unpredicted movement between the head and the disc. Such unpredicted movement can cause read/write errors. Additionally, such movement prevents narrower tracks from being used in disc drives, and thus limits the memory capability of the disc drive. To decrease the vibrations in the actuator arms, the arms are typically constructed with resonant frequencies that are well above the driving frequencies of the disc drive.

Accordingly, there is a need for a disc drive actuator assembly that decreases the costs of manufacture and that decreases vibrations of the actuator arms and head gimbal assemblies. The present invention provides a solution to these and other problems, and offers other advantages over the prior art.

SUMMARY OF THE INVENTION

Against this backdrop the present invention has been developed. The invention features a stacked actuator assembly having symmetrical actuator arms and spacers stacked on a rotatably mounted sleeve. The assembly may have circuit elements attached on one side of the assembly. The weight of these circuit elements is counter balanced by a screw or pin mounted on the other side of the assembly. The screw passes through the stacked armature arms and spacers to clamp the arms and spacers relative to each other and prevent them from rotating relative to each other.

In addition, the spacers may be position registered relative to each other by registration members molded into the spacers. The registration members in adjacent spacers mate with each other to register the spacers relative to each other.

The stacked actuator assembly may be assembled on a jig. The jig has a mounting hole or post to receive the sleeve for the stacked actuator assembly, and it has a post to register the arms when they are stacked on the sleeve. It has a spacer registration member to register the first spacer stacked on the sleeve; thereafter, the additional spacers stacked on the assembly register relative to each other. Alternatively, the jig may have a second post to register the position of the spacer with the overmold that carries the coil of the voice coil motor that drives the stacked actuator arm assembly.

These and various other features as well as advantages which characterize the present invention will be apparent from a reading of the following detailed description and a review of the associated drawings.

DETAILED DESCRIPTION

Figure 1:
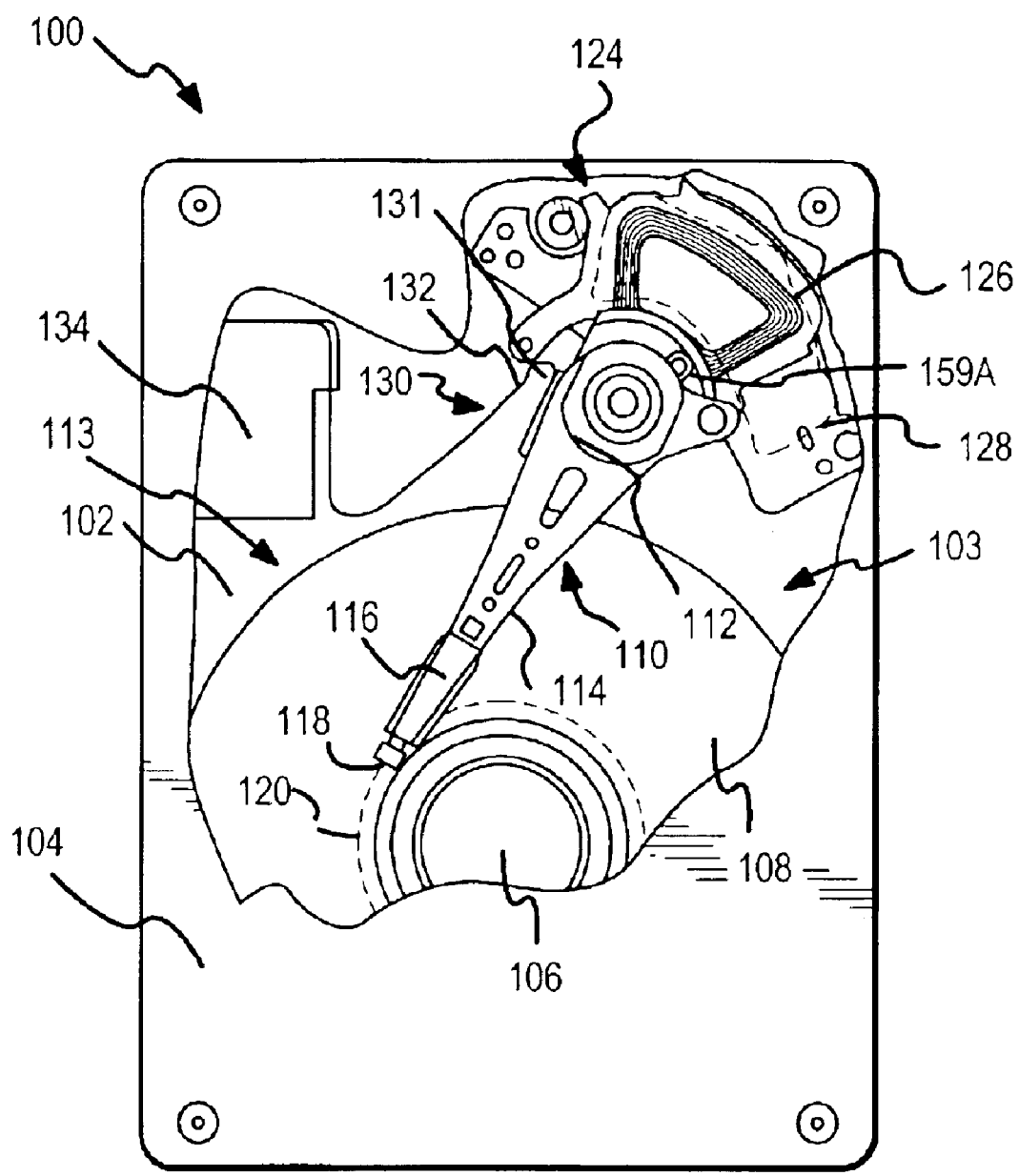
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 103 at a constant high speed. Information is written to and read from tracks on the discs 103 through the use of an actuator assembly 110, which rotates during a seek operation about a bearing shaft assembly 112 positioned adjacent the discs 103. The actuator assembly 110 includes a plurality of stacked, symmetrical actuator arms 114 which extend towards the discs 103, with one or more head gimbal assemblies 113 extending from each of the actuator arms 114. Each head gimbal assembly includes a flexure or load beam 116 and a head 118 mounted at the distal end of the load beam 116. Each actuator arm 114 is a metal arm on which at least one head gimbal assembly is mounted. Each head 118 includes an air bearing slider enabling the head 118 to fly in close proximity above the corresponding recording surface 108 of the associated disc 103.

During a seek operation, the track position of the heads 118 is controlled through the use of a voice coil motor 124, which typically includes a coil 126 attached to the actuator assembly 110, as well as one or more permanent magnet 128, which establish a magnetic field in which the coil 126 is immersed. Preferably, the coil 126 is formed as an integral part of a plastic mold extension of at least one actuator arm 114. The controlled application of current to the coil 126 causes magnetic interaction between the permanent magnet 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 103.

A flex assembly 130 provides the requisite electrical connection paths for the actuator assembly 110 while allowing pivotal movement of the actuator assembly 110 during operation. The flex assembly includes a printed circuit board 131 attached to one side of the stack of actuator arms 114 and a flex cable 132. Head wires (not shown) are connected to the printed circuit board; the head wires are routed along the actuator arms 114 and the load beams 116 to the heads 118. The printed circuit board 131 preferably includes circuitry for controlling the write currents applied to the heads 118 during a write operation and a preamplifier for amplifying read signals generated by the heads 118 during a read operation. Additionally, the portion of the head wires that are routed along the actuator arms 114 are preferably a flex circuit attached to actuator arms 114 and load beams 116. The flex assembly also includes a flex cable 132 that extends from the circuit board 131 and terminates at a flex bracket 134. The flex bracket 134 communicates through the base deck 102 to a disc drive printed circuit board (not shown) mounted to the bottom side of the disc drive 100.

Figure 2:
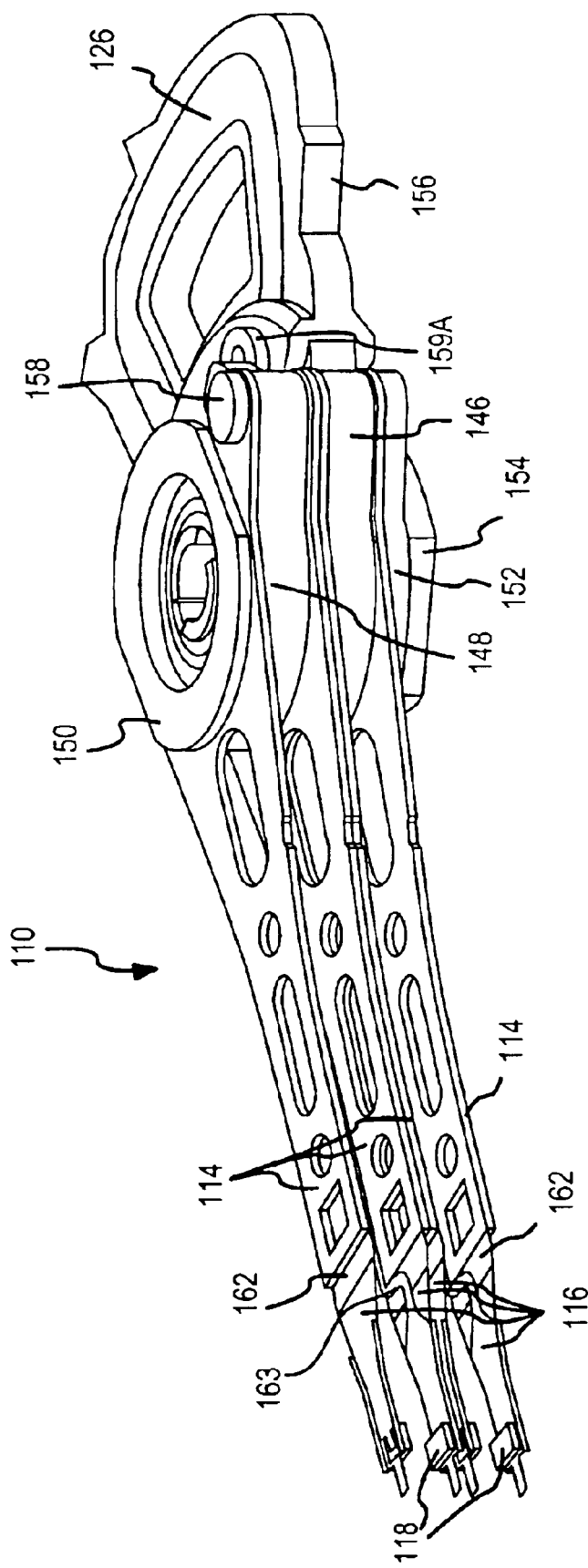
FIG. 2 is a perspective top view of an actuator assembly according to an embodiment of the present invention.
Figure 3:
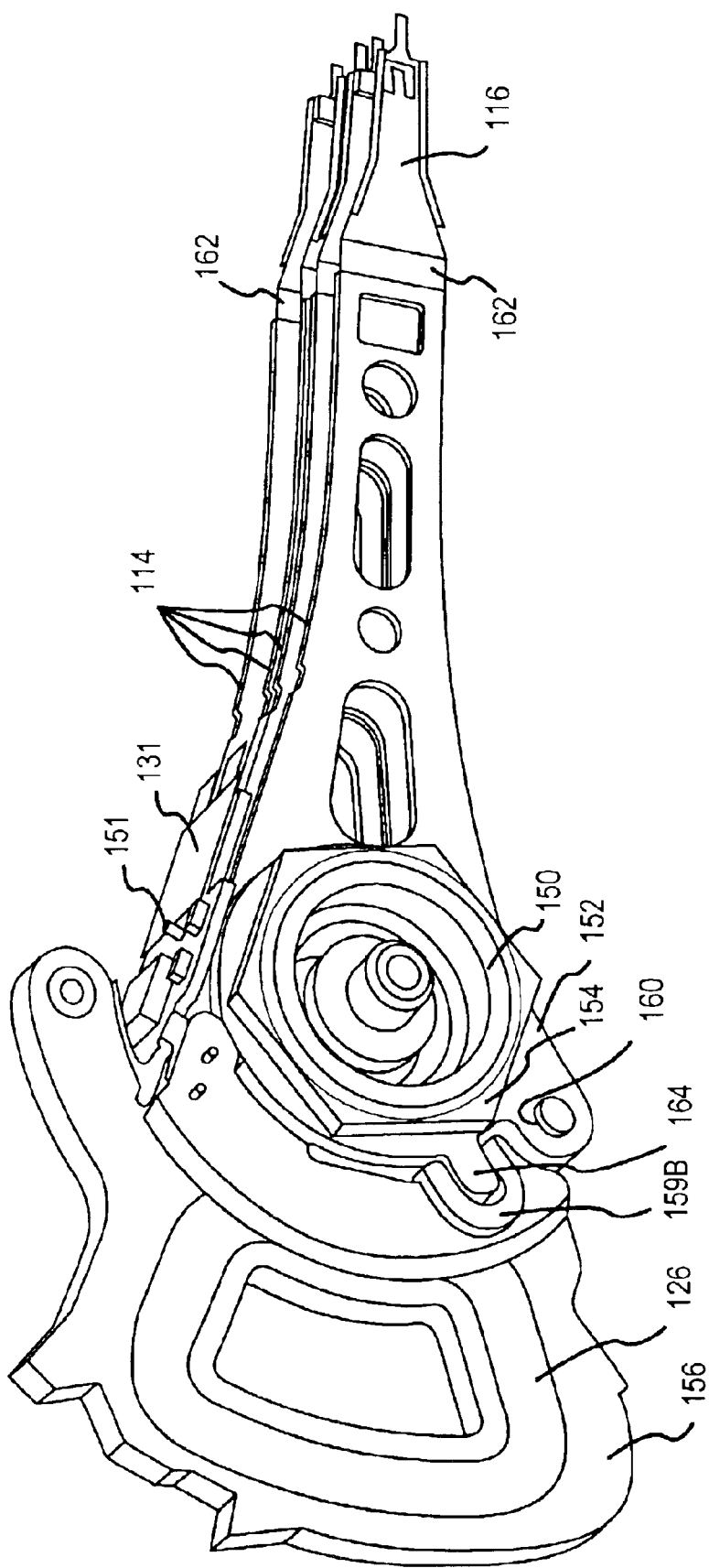
FIG. 3 is a perspective bottom view of the actuator assembly of FIG. 2.

Referring now to FIGS. 2 and 3, one embodiment of the stacked actuator arm assembly is shown in a top perspective view in FIG. 2 and a bottom perspective view in FIG. 3. The stacked assembly is made up of four actuator arms 114 and two spacers 146 and 148 between the actuator arms. The actuator arms and the spacers are stacked on sleeve 150. A nut spacer 152 is placed between the last actuator arm on the stack and the nut 154. Nut 154 is threaded on the bottom of sleeve 150.

Printed circuit board 131 is attached at one side of the actuator assembly through a solder screw 151 that engages the lower spacer 146. The lower spacer 146 also has a plastic overmold extension (also referred to herein as the overmold) 156. The overmold extension 156 carries the coil 126 of the voice coil motor. The permanent magnet and the magnetically permeable return path plates of the voice coil motor are not shown in FIGS. 2 and 3.

In addition to the nut 154 holding the stacked actuator arm assembly together, there is also provided a pin or screw 158 that passes through all of the stacked elements and is threaded into the hole 160 in nut spacer 152. The screw 158 serves multiple functions. It provides a counter balancing weight for the printed circuit 131 on the opposite side of the stack assembly, and it also provides a second fastener for the stack assembly to prevent the actuator arms from rotating relative to each other, i.e. fanning out. By balancing out the weight of the printed circuit board with the screw 158, the actuator arms 114 and their load beams 116 may all be substantially-symmetrical. The symmetry of the actuator arms is important in high performance high track density drives to minimize distortion of the actuator arms during high speed movements. Substantially-symmetrical as used herein means shape and/or mass symmetry in the arms such that if the center of the arm at the distal end has a point load applied, the corners of the distal end of the arm deflect the same amount; i.e. the arm does not twist.

The load beams are attached to the actuator arms by spring members 162 which provide a spring force to load the heads 118 adjacent the surface of the discs 103 (FIG. 1) as the heads are flying above the surface. A flex cable 163 passing from the actuator arms to the load beams and ultimately to the heads 118 is also shown in FIG. 2.

The nut spacer 152 in addition to providing the threaded hole into which screw 158 is screwed also provides a registration extension 164. The nut spacer registration extension 164 engages a tight tolerance (relative to extension 164) slot 159B in the overmold 156. This serves to precisely register the lower spacer 146 in position relative to the screw 158 by virtue of the pin's position relative to extension 164. If the screw 158 is registered relative to the actuator arms 114, this means the lower spacer 146 is precisely registered to the actuator arms 114. If the screw is not tightly registered to the actuator arms 114 because the holes 172 through the actuator arms have a loose tolerance relative to the screw diameter, then the arms 114 are registered to lower spacer 146 via the jig 168 during assembly as will be described with reference to FIG. 4.

Figure 4:
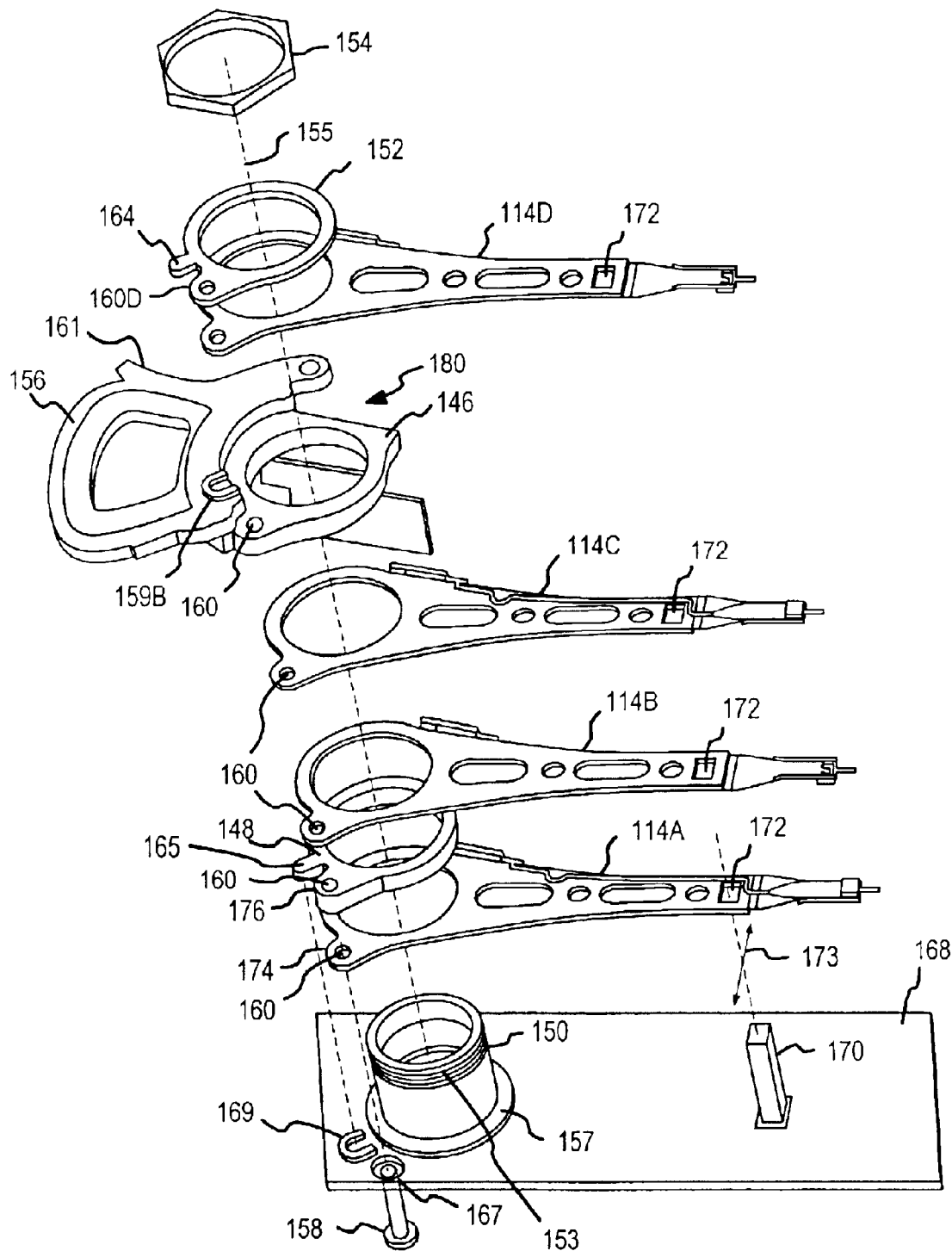
FIG. 4 is an exploded perspective view of the actuator assembly of FIGS. 2 and 3.

FIG. 4 illustrates the steps in assembling the stacked actuator assembly. Sleeve 150 with a cartridge bearing assembly mounted inside is placed in a mounting hole or over a mounting post in a jig 168. The mounting hole or post for the sleeve serve to position the sleeve precisely in the jig. Jig 168 also has a registration post 170 mounted therein. A hole or bore 167 is placed in the jig 168 to receive screw 158. Bore 167 has a diameter larger than the head of screw 158 so that the screw may pass through the bore and into the stacked elements of the actuator assembly. After the stacked elements of the actuator assembly are in place, screw 158 may be driven to rise out of bore 167 and engage holes 160 in the stacked elements. The post 170 and the sleeve 150 are precisely positioned in the jig 168 so as to register each of the arms 114 between the sleeve 150 and the post passing through hole 172 of each arm 114. Post 170 is preferably shaped and size-toleranced relative to holes 172 to align the arms laterally, i.e. in the direction 173 across the width of the arm. With the sleeve 150 and the post 170 in proper registered position, arm 114A is placed on the sleeve 150. Note that the sleeve 150 is inverted relative to its position in FIG. 2. Next the "upper" spacer 148 is positioned on top of arm 114A with the upper spacer's hole 160 aligned with hole 160 of arm 114A. The upper spacer 148 contains a registration extension 165 which ultimately will engage a vertical portion of a slot 159A (FIG. 5) in the overmold 156 of "lower" spacer 146. In the meantime jig 168 provides a raised slot member 169 to engage the registration extension 165 of the upper spacer 148 and thereby register the upper spacer in the correct position.

Arms 114B and 114C are then placed over the sleeve 150 and registration screw 170 and are thereby registered in proper position. Then the lower spacer 146 with overmold 156 attached to it, or molded to it, is placed over the sleeve 150. The lower portion of slot 159A (FIG. 5) will engage extension 165 of upper spacer 148. This will register the lower spacer 146 with overmold and coil are in correct position relative to arms 114A, 114B, 114C and 114D.

Alternatively, in another embodiment raised slot member 169 is removed from the jig and an additional registration post (not shown) is added to the jig. In this embodiment jig 168 is extended to the left in FIG. 4 and the additional post is added to position-register against wall 161 of the overmold 156 during assembly. (When assembled into the disk drive, wall 161 engages a stop to limit the movement of the actuator arm assembly.) By registering lower spacer 146 to this additional post and by registering the arms 114 to the post 170, the lower spacer is registered relative to the arms.

Arm 114D is now placed over the sleeve 150 and post 170 and registered in correct angular position with the other arms. Nut spacer 152 is added to the stack over the sleeve 150 and aligned in correct position by its extension 164 engaging in the slot 159B of the overmold. Nut 154 is then threaded onto the sleeve 150. Screw 158 is inserted upward from bore 151 through the holes 160 of the arms and spacers. Holes 160 in the stacked elements except for nut spacer 152 have a diameter to pass the threads of screw 158. Hole 160 of nut spacer 152 has a interior threaded diameter to engage the threads on screw 158. When screw 158 reaches hole 160 in the nut spacer 152, it is rotated to screw into the hole 160 of nut spacer 152. With both the nut 154 threaded on the sleeve 150, and the screw 158 screwed into hole 160 of the nut spacer, the screw 158 and nut 154 may be tightened down to hold the stacked actuator assembly together.

Figure 5:
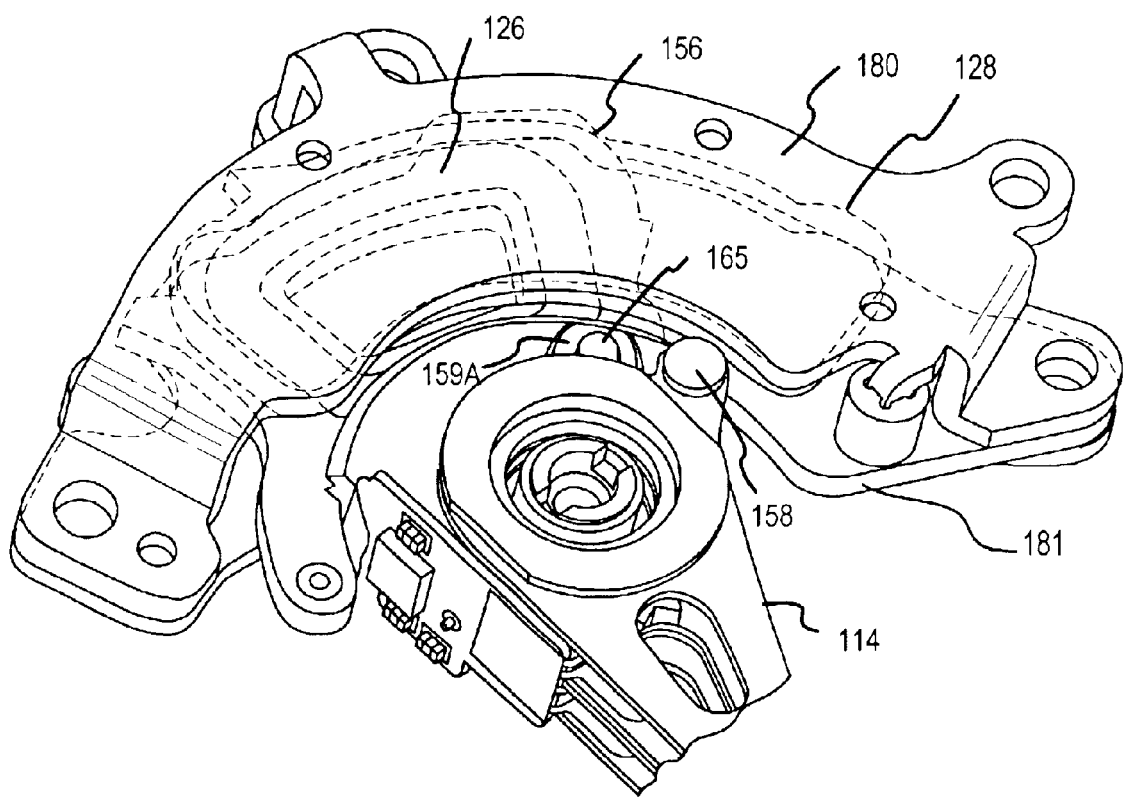
FIG. 5 shows a perspective top view of the stacked actuator assembly along with the permanent magnet and permeable material plates of the voice coil motor.

FIG. 5 is a bottom perspective view of the actuator assembly and in addition shows the position of the permanent magnet 128, upper magnetically permeable plate 180 and lower magnetically permeable plate 181 relative to coil 126 to form the voice coil motor. Elements in FIG. 5 have been given the same reference numerals as the same elements in FIGS. 1 through 4, but these elements are not described again for FIG. 5. Permanent magnet 128, lower magnetically permeable plate 181 and overmold 156 with coil 126 are shown in dashed lines under the upper magnetically permeable plate 180. The permanent magnet 128 is above the overmold 156 and coil 126. Plates 180 and 181 provide a return path to complete the magnetic circuit for the flow of magnetic flux back to the permanent magnet 128.

In summary, the stacked actuator assembly is used in a disc drive 100 having rotatable discs 103 mounted on a spindle 106 and driven by a spindle motor mounted on a base 102. The stacked actuator arm assembly 110 is rotatably driven to position read/write heads 118 over the discs 103 in the disc drive. An actuator arm 114 and a spacer 146 are stacked on a sleeve 150 rotatably mounted on the disc drive. The actuator arm 114 is substantially-symmetrical about a center line from the axis of the sleeve 150 to the distal end of the actuator arm. A load beam 116 for each actuator arm has a proximal end attached to the distal end of the actuator arm 114 and a distal end supporting a read/write head 118. A flex circuit 131 is attached to one side of the actuator arm assembly. The flex circuit provides read/write circuit elements for the read/write heads. A pin 158 is positioned on the opposite side of the stacked assembly from the flex circuit and is registered with an aligned hole 160 through the actuator arms and the spacers between actuator arms. The pin 158 provides at least in part a counter balancing weight for the flex circuit 131.

In the actuator assembly the actuator arm 114 and the load beam 116 comprise a metallic material. There may be a plurality of actuator arms 114 and one or more spacers such as 146 and 148. The pin 158 prevents the actuator arms 114 and spacers 146, 148 between actuator arms from rotating relative to each other. The sleeve 150 has a flange on one end and threads on the other end. If there are two actuator arms such as 114C and 114D in FIG. 4, a spacer 146 is located between a first actuator arm 114C and a second actuator arm 114D. A nut spacer 152 is located between the second actuator arm 114D and a nut 154 threaded on the sleeve 150 to hold the stacked actuator arm assembly 110 together.

Each of the actuator arms 114 and spacers 146, 148 and 152 have a registration hole 160 through which the pin 158 passes. Spacer 146 between the actuator arms 114C and 114D has an overmold extension 156 to carry the coil 126 of the voice coil motor that provides the motive force to rotate the actuator arm. The overmold extension 156 is shaped with registration member 159B to engage an extension 164 on the nut spacer 152 so as to register the nut spacer position relative to the spacer between the actuator arms.

In summary, a disc drive 100 has a plurality of rotatable discs 103 and a stacked actuator assembly 110 operable to move at least one read/write head over each recording surface 108 of the rotatable discs. The actuator assembly 110 has a plurality of actuator arms 114, each arm carrying a read/write head 118. A sleeve 150 rotatable mounted on the disc drive carries the actuator arms in stacked array 114A, 114B, 114C and 114D along the axis 155 of the sleeve 150. Each of the actuator arms is substantially-symmetrical about a center line from the axis 155 of the sleeve to the distal end of the actuator arm 114. A plurality of spacers 146,148 are mounted on the sleeve 150. A spacer 146, 148 is mounted between actuator arms 114A, 114B and 114C, 114D carrying read/write heads 118 for opposite sides of a rotatable discs 103 so that the spacer provides separation between the arms to accommodate rotatable discs 103 positioned between the arms 114A and 114B and arms 114C and 114D. A screw 158 clamps the actuator arms and spacers relative to each other and provides a counter weight to balance the weight of elements, such as circuit board 131 and flex circuit 132, mounted on the opposite side of the actuator assembly from the screw.

One of the spacers 146 carries a motive element 126 which provides a motive force to rotate the actuator assembly 110 to move the read/write heads 118 across the recording surfaces 108 of the discs 103. The spacers are of two types with regard to registration elements. First spacers 148, 152 have a registration element as extensions 165, 164 respectively. Second spacers like spacer 146, alternately stacked along the sleeve with the first spacers 148 and 152, have a registration element as slot 159A, 159B designed to receive registration extensions 164, 165 from adjacent first spacers whereby the first and second spacers are registered relative to each other.

The sleeve 150 has a flange 157 at one end and screw threads 153 at the other end. A threaded nut 154 threads onto the threaded end 153 of the sleeve to hold the stacked actuator assembly 110 together. A nut spacer 152 is located between a last armature arm 114D on the sleeve 150 and the threaded nut 154. The nut spacer 152 is position registered relative to the other spacers 146, 148 and has a threaded hole 160D to receive the screw.

In summary a method for assembling a stacked actuator arm assembly for a disc drive, the armature arms being substantially-symmetrical along their length, is depicted in FIG. 4. A rotatable sleeve 150 is placed in a jig 168 having an arm registration member 170 for positioning armature arms relative to each other and the sleeve 150. A spacer registration member 169 positions spacer 148 relative to each other and the sleeve 150. A first substantially-symmetrical armature arm 114A is placed over the sleeve, the first arm engages the arm registration member 170. A spacer 148 is placed over the sleeve on top of the first arm, the spacer having a spacer registration member 165 engaging the spacer registration member 169 of the jig. A last substantially-symmetrical armature arm 114D is added on top of a preceding spacer, the last arm engaging the arm registration member 170. A screw 158 is inserted on one side of the actuator assembly through an aligned hole 160 in all spacers and armature arms. The screw has weight to counterbalance at least in part the weight of a circuit element 131 mounted on a side of the stacked actuator assembly opposite the one side.

A nut spacer 152 is added on top of the last armature arm 114D; the nut spacer has a spacer registration member 164 engaging the spacer registration member 159B of the preceding spacer. A nut 154 is threaded onto the sleeve 150 above the nut spacer 152 to hold the stacked armature arm assembly 110 together. Screw 158 is screwed into a threaded hole 160D in the nut spacer 152.

To add more armature arms, two, substantially-symmetrical armature arms 114B and 114C are added on top of the first spacer 148 and over the sleeve 150; each of the arms engages the arm registration member 170. Another spacer 146 is placed over the sleeve 150 on top of the two, substantially-symmetrical armature arms, the another spacer has a spacer registration member 159A engaging the spacer registration member 165 of an adjacent spacer 148. Additional pairs of armature arms may be added by repeating these two steps.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, many different registration element shapes may be used to position arms and spacers relative to each other hole in accordance with the present invention. Numerous other changes may be made which will readily suggest themselves to those skilled in the art and which are encompassed in the spirit of the invention disclosed and as defined in the appended claims.

What is claimed is:

1. In a disc drive having a rotatable disc mounted on a spindle and driven by a spindle motor mounted on a base, a stacked actuator arm assembly rotatably driven to position read/write heads over the disc in the disc drive, said stacked actuator assembly comprising:
   an actuator arm and a spacer stacked on a sleeve rotatably mounted on the base;
   a load beam for each actuator arm with a proximal end attached to the actuator arm and a distal end supporting a read/write head; and
   a flex circuit attached to one side of the actuator arm assembly, the flex circuit providing read/write circuit elements for the read/write heads;
   a pin positioned on the opposite side of the stacked assembly from the flex circuit and registering with an aligned hole through the actuator arm and the spacer; the pin providing at least in part a counter balancing weight for the flex circuit.

2. The actuator assembly of claim 1, wherein the actuator arm and load beam comprises a metallic material.

3. The actuator assembly of claim 1 wherein the actuator arm is substantially-symmetrical about a center line from the axis of the sleeve to the distal end of the actuator arm.

4. The actuator assembly of claim 1 and in addition:
   a plurality of actuator arms and one or more spacers are mounted on the sleeve; and
   the pin prevents the actuator arms and the one or more spacers from rotating relative to each other.

5. The actuator assembly of claim 4 wherein the sleeve has a flange on one end and threads on the other end and the actuator assembly further comprises:
   a spacer between a first and second actuator arm; and
   a nut spacer between the second actuator arm and a nut threaded on the sleeve to hold the stacked actuator arm assembly together.

6. The actuator assembly of claim 5, wherein each of the actuator arms and spacers have a hole through which the pin passes.

7. The actuator assembly of claim 6, wherein the spacer between the actuator arms has an overmold extension to carry a coil of a voice coil motor that provides the motive force to rotate the actuator arm.

8. The actuator assembly of claim 7, wherein the overmold extension is shaped to engage an extension on the nut spacer so as to register the nut spacer position relative to the spacer between the actuator arms.

9. A disc drive comprising a plurality of rotatable discs and a stacked actuator assembly operable to move at least one read/write head over each recording surface of the rotatable discs, the actuator assembly comprising:
   a plurality of actuator arms, each arm carrying a read/write head;
   a sleeve rotatable mounted on the disc drive and carrying the actuator arms in stacked array along the axis of the sleeve;
   each of said actuator arms being substantially-symmetrical about a center line from the axis of the sleeve to a distal end of the actuator arm;
   one or more spacers also mounted on the sleeve, a spacer being mounted between actuator arms carrying read/write heads for opposite sides of a rotatable disc so that the spacer provides separation between the arms to accommodate the rotatable disc positioned between the arms; and
   a screw for clamping the actuator arms and spacers relative to each other and providing a counter weight to balance the weight of elements mounted on the opposite side of the actuator assembly from the screw.

10. The actuator assembly of claim 9 further comprising:
    one of said spacers carrying a motive element which provides a motive force to rotate the actuator assembly to move the read/write heads across the recording surfaces of the discs.

11. The actuator assembly of claim 10, wherein said elements mounted on the opposite of the actuator assembly comprises:
    a printed circuit board and a flex circuit providing electrical connection to the read/write heads.

12. The actuator assembly of claim 9 wherein said spacers comprise:
    first spacers having a registration extension; and
    second spacers alternately stacked along the sleeve with the first spacers and having a registration slot designed to receive registration extensions from adjacent first spacers whereby the first and second spacers are registered relative to each other.

13. The actuator assembly of claim 12 wherein the sleeve has a flange at one end and screw threads at the other end and the assembly further comprises:
    a threaded nut for threading onto the end of the sleeve to hold the stacked actuator assembly together; and
    a nut spacer between a last armature arm on the sleeve and the threaded nut, the nut spacer position registered relative to the other spacers and having a threaded hole to receive the screw.

* * * * *